United States Patent
Klotz et al.

(10) Patent No.: US 7,583,613 B2
(45) Date of Patent: Sep. 1, 2009

(54) METHOD OF MONITORING THE QUALITY OF A REALTIME COMMUNICATION

(75) Inventors: Bernhard Klotz, Stuttgart (DE); Uwe Ackermann, Freiberg (DE)

(73) Assignee: Alcatel Lucent, Paris (FR)

( * ) Notice: Subject to any disclaimer, the term of this patent is extended or adjusted under 35 U.S.C. 154(b) by 297 days.

(21) Appl. No.: 11/565,934

(22) Filed: Dec. 1, 2006

(65) Prior Publication Data

US 2007/0127389 A1 Jun. 7, 2007

(30) Foreign Application Priority Data

Dec. 5, 2005 (EP) .................................. 05292591

(51) Int. Cl.
*H04L 1/20* (2006.01)

(52) U.S. Cl. ............. 370/252; 379/406.01; 379/406.06; 379/406.1

(58) Field of Classification Search ................. 370/241, 370/252; 709/223, 224; 379/406.01, 406.06, 379/406.1
See application file for complete search history.

(56) References Cited

U.S. PATENT DOCUMENTS

| | | | |
|---|---|---|---|
| 5,477,531 A | 12/1995 | McKee et al. | |
| 7,525,952 B1 * | 4/2009 | Shankar et al. | 370/352 |
| 2004/0062204 A1 * | 4/2004 | Bearden et al. | 370/250 |
| 2004/0071084 A1 | 4/2004 | El-Hennawey et al. | |
| 2006/0050649 A1 * | 3/2006 | Botton-Dascal et al. | 370/252 |
| 2006/0256720 A1 * | 11/2006 | Curran-Gray et al. | 370/235 |

FOREIGN PATENT DOCUMENTS

WO 0230042 A2 4/2002

* cited by examiner

*Primary Examiner*—William Trost, IV
*Assistant Examiner*—Charles C Jiang
(74) *Attorney, Agent, or Firm*—Fay Sharpe LLP

(57) ABSTRACT

The invention concerns a method, a network element and a computer program product for monitoring the quality of a real-time communication (9) in a packet network (1) comprising at least two test points (3, 4). A packet stream pattern (22) is accessed and injected at a first test point (3). After transmission of the packet stream pattern (22) through the packet network (1), a degraded packet stream pattern (23) is received at a second test point (4). Characteristics of the degraded packet stream pattern (23) are determined and compared with corresponding characteristics of the packet stream pattern (22) injected at the first test point (3). Based on the comparison, data concerning quality degradation caused by transmission over the packet network (1) is evaluated.

19 Claims, 5 Drawing Sheets

METHOD OF MONITORING THE QUALITY OF A REALTIME COMMUNICATION

The invention is based on a priority application EP 05 292 591.4 which is hereby incorporated by reference.

BACKGROUND OF THE INVENTION

In the field of computer networks, ICMP Echo, more familiar as PING, is a tool for measuring the delay of an Internet connection between a client and a target host (ICMP=Internet Control Message Protocol; PING=Packet Internet Groper). The quality of data communication is further checked by test messages resembling the real data stream, and evaluating the delay of individual messages, the transmission failures, retransmissions and uncorrected errors.

With the growing use of packet based telecommunication channels for highly delay-sensitive applications such as telephony or video conferencing, there is also a need to monitor the quality of a packetised real-time connection. Contrary to data transmission, lost or erroneous packets cannot be retransmitted due to time constraints, but are simply omitted. Thus the degradation of the content, e.g., sound or image, must be evaluated.

Available assessment tools typically monitor and analyse network-level VoIP performance in terms of quality of service (=QoS) or compliance with service level agreements (=SLAs), using packet-based measurements such as jitter, loss, and delay (VoIP=Voice over Internet Protocol).

US 2004/0062204 A1 gives a short overview of conventional monitoring systems used for end-to-end measurements, i.e., from one terminal to another terminal. Some quality monitoring systems known on the market make use of so-called "synthetic" IP telephones, others utilise a so-called "passive" approach (IP=Internet Protocol). All prior art systems have considerable drawbacks which make it difficult to efficiently measure the contribution of a packet network to a streamed media quality degradation.

SUMMARY OF THE INVENTION

It is the object of the present invention to provide an improved quality monitoring of real-time communication in packet networks.

The object of the present invention is achieved by a method of monitoring the quality of a real-time communication in a packet network comprising at least two test points, wherein the method comprises the steps of accessing a packet stream pattern; injecting the packet stream pattern at a first test point of the at least two test points, receiving, after transmission of the packet stream pattern through the packet network, a degraded packet stream pattern at a second test point of the at least two test points, determining characteristics of the degraded packet stream pattern, comparing the characteristics of the degraded packet stream pattern with corresponding characteristics of the packet stream pattern injected at the first test point, and evaluating, based on the comparison result, data concerning quality degradation caused by transmission through the packet network. Further, the object of the present invention is also achieved by a network element of a packet network for monitoring the quality of a real-time communication in the packet network, whereby the packet network comprises at least two test points and wherein the network element comprises a control unit adapted to trigger the access of a packet stream pattern, initiate the injection of the packet stream pattern at a first test point of the at least two test points, initiate, after transmission of the packet stream pattern through the packet network, the reception of a degraded packet stream pattern at a second test point of the at least two test points and the determination of characteristics of the degraded packet stream pattern, control the comparison of the characteristics of the degraded packet stream pattern with corresponding characteristics of the packet stream pattern injected at the first test point and the evaluation, based on the comparison result, of data concerning quality degradation caused by transmission through the packet network. And the object of the present invention is further achieved by a computer program product for monitoring the quality of a real-time communication in a packet network comprising at least two test points, whereby the computer program product performs, when executed by a network element of the packet network, the steps of triggering the access of a packet stream pattern, initiating the injection of the packet stream pattern at a first test point of the at least two test points, initiating the reception, after transmission of the packet stream pattern through the packet network, of a degraded packet stream pattern at a second test point of the at least two test points and the determination of characteristics of the degraded packet stream pattern, comparing the characteristics of the degraded packet stream pattern with corresponding characteristics of the packet stream pattern injected at the first test point and evaluating, based on the comparison result, data concerning quality degradation caused by transmission through the packet network.

The invention allows a simple and easy quantification of the impact of the packet network on the quality of communication, e.g., for the verification of SLAs.

Another advantage of the invention is that bandwidth needed for quality monitoring is reduced. Reference signals of a real-time communication need not be transmitted from a transmitter through the network to a receiver, and the received packets back again to a evaluation instance. Instead, it is sufficient that the characteristics of a received packet pattern, e.g., the sequence order and the arrival time of the packets and not the content, are transmitted to the evaluation instance.

The invented method is implemented in elements of the packet network, and it can be combined with other measurement procedures, e.g., to verify data transmission. Only components common in packet networks are used. Any equipment specialised to process communication like voice or video codecs are avoided, so the method can be applied by a network operator offering packet transmission to customers, without using equipment which is specific to an application.

The invention provides an extension to pure data measurements by simulating voice or other media transmission characteristics. The invention can be implemented in a packet network by means of pure software extension; no hardware modifications are required.

Further advantages are achieved by the embodiments of the invention indicated by the dependent claims.

According to a preferred embodiment of the invention, the time of arrival of each single packet of the degraded packet stream pattern arriving one after another at the second test point and/or the sequence of arrival of the packets of the degraded packet stream pattern arriving one after another at the second test point are measured. The measured arrival times of the packets and/or the measured arrival sequence of the packets may be used as characteristics of the degraded packet stream pattern. These values may represent all used characteristics, alternatively, also other additional values and parameter of the packets may be used as characteristics of the degraded packet stream pattern.

Due to the multitude of different packet transport paths used in a packet network, the disarrangement of a packet stream pattern arriving at the second test point may be different for each transmission of the packet pattern through the network. For example, at a first transfer test, the majority of packets of the packet pattern has been transported via the same path. However, at a second transfer test, each packet of the packet pattern has been switched via a different path. In order to make a relatively reliable judgment of the transport quality of a packet network, statistics have to be compiled. Usually, it is only after a packet stream pattern has been sent a great number of times across the same network that the averaged characteristic values of the degraded packet stream pattern converge.

Therefore, in a preferred embodiment, the steps of injecting the packet stream pattern, receiving the degraded packet stream pattern, and determining characteristics of the degraded packet stream pattern are repeated or performed periodically. The characteristics accumulated in the first test run and the subsequent reiterations are compared with corresponding characteristics of the original packet stream pattern. From the comparison results, statistics may be compiled. The statistics can help to find, e.g., temporal trends, peak values, mean values, or other statistical values, which may be used for a quality prediction of a real-time communication.

According to another preferred embodiment of the invention, the comparison result is applied to media streams of a real-time application. This way, the specifics of a real-time application such as real-time audio or video can be taken into consideration when evaluating a signal quality degradation. For example, a user may feel a different level of annoyance by packet jitter originating in the packet network, depending on whether the user makes a telephone call or the user sees a video clip. While, with a specific jitter level, a telephone call may only show a somewhat degraded quality but still be comprehensible, a video may become rather unintelligible.

In a preferred embodiment, the test points used in the quality monitoring are all kept synchronised in time. Then the packet stream pattern is injected at the first test point at defined times, preferably in a predefined schedule. The arrival time of the single packets of the degraded packet stream pattern arriving at the second test point is measured. Due to the tight synchronisation of the test points, the delay of packets can be determined very accurately. Therefore, the signal quality degradation, in particular the signal quality degradation caused by temporal effects such as packet delay or jitter, can be evaluated very well.

According to another preferred embodiment of the invention, the original packet stream pattern is transported either one-way, i.e., always from a first test point to a second test point, or both ways, i.e., from a first test point to a second test point and back again from the second test point to the first test point.

According to another preferred embodiment of the invention, the first test point and the second test point of the packet network are pre-defined measurement points at identified network elements. For example, the test points may be implemented into switching units, POPs, gateways, etc. of the network. Thus, the measured signal degradation has been caused by the packet network and the associated network elements, only. The effect of the network and/or specific parts of the network on the quality degradation can be evaluated.

According to another preferred embodiment of the invention, the quality monitoring is performed end-to-end between terminals of a real-time communication. The packet stream pattern is injected at a first terminal, transmitted through switching elements and the packet network to a second terminal where a degraded packet stream pattern is received. The packets run through both the terminals, the switching elements, network segments such as HFC networks, and the packet network itself (HFC=Hybrid Coaxial Cable). Therefore, the end-to-end measurement comprehends all signal degradation sources.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF PREFERRED EMBODIMENTS

Figure 1:
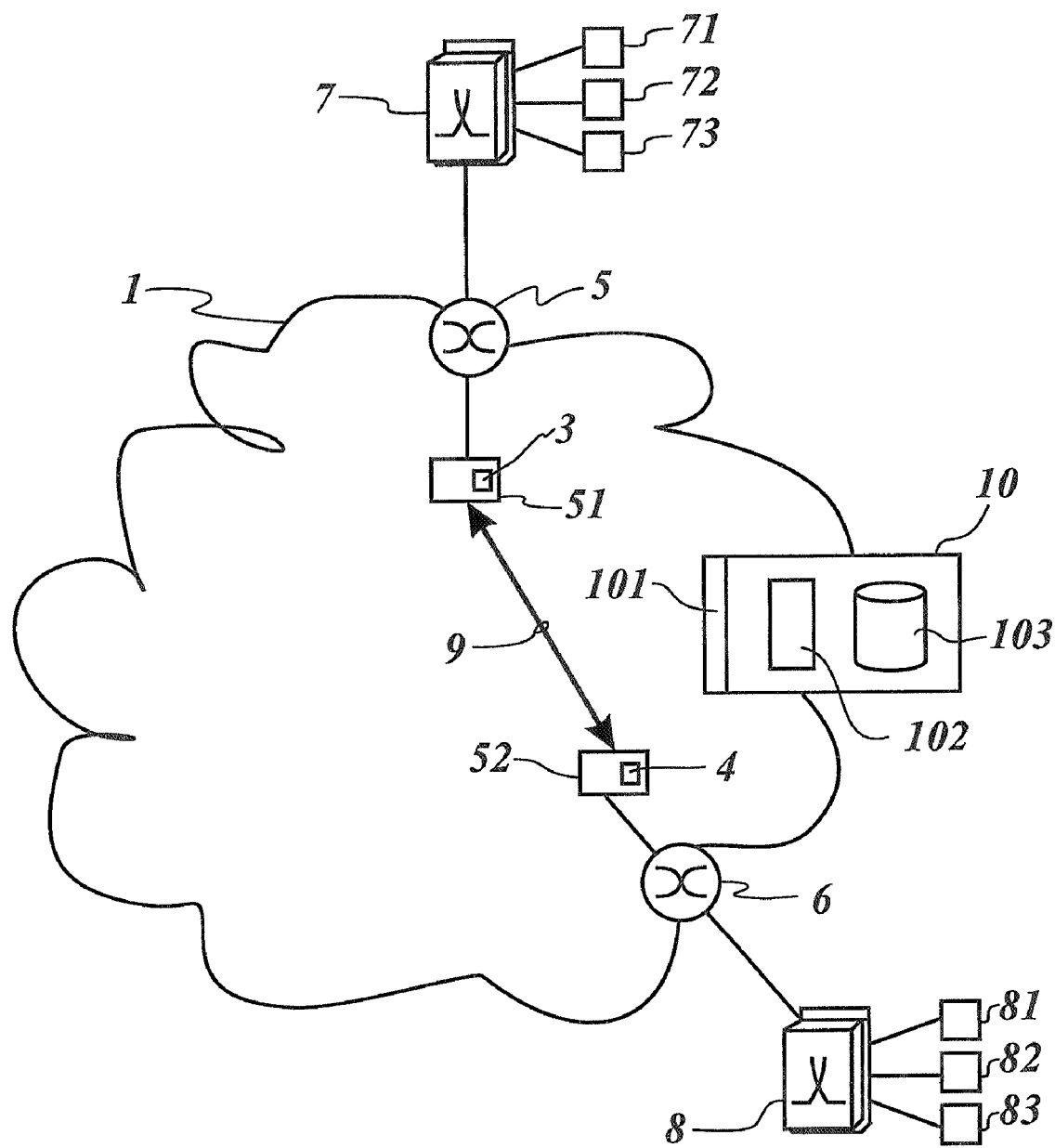
FIG. 1 is a block diagram of a system for providing quality monitoring in a packet-switching network.

FIG. 1 shows a packet-switching network 1 operating under a packet transfer protocol such as IP, UDP, or RTP (UDP=User Datagram Protocol; RTP=Real Time Protocol). The network 1 comprises routers and switches 51, 52 for switching packets transported through the network 1, a number of test points 3, 4 located at relevant locations of the packet network 1 such as at POPs, exchanges, or switches 51, 52, and a controller 10 (POP=Point of Presence). In this description, the terms "probe" and "test point" are meant to denote the same and are used interchangeably. Each of the probes 3, 4 located at the network switches 51, 52 is connected to a gateway 5, 6 providing an interface between the packet network 1 and a local switching unit 7, 8, e.g., for switching telephony or multimedia data. The user terminals 71 to 73, 81 to 83 are connected to the local switching units 7, 8, which could also be part of a separate network.

The controller 10 comprises at least one interface module 101 for communicating with the transmitter probe 3 and the receiver probe 4, a control unit 102 for controlling the quality monitoring, and a memory unit 103 for the storage of data. For sake of simplicity of the explanation, the probes are denoted as transmitter and receiver, but the probes can bear both roles simultaneously for bi-directional tests.

The method represents an "active" approach, making use of the comparison of an original reference signal with the degraded signal after transmission through the packet network, both in a packet representation specific for the application. This way, it is possible to characterise the transmission of the real-time communication packets. The real-time communication may be multimedia or voice such as VoIP.

Basically, the quality monitoring comprises two steps. In a first step, a reference signal is transmitted in packets from the first probe 3 of the network 1 through the network 1 to the second probe 4 of the network 1. The characteristics, e.g., time and sequence of arrival, of the signal packets received at the second probe 4 are registered. In a second step, a comparison of the sent and the received packets allows to provide a simple quantification of the degradation of packetised real-time communication within the packet network 1. Thus, the quality of packet transmission for, e.g., VoIP can easily be supervised in order to verify SLAs.

In the comparison, characteristics of the degraded signal packets received at the second probe 4, e.g., the packet sequence and the packet arrival times, are contrasted with the corresponding characteristics of the original signal packets injected at the first probe, e.g., the packet sequence and the packet dispatch times. The transmission through the packet network 1 may cause, e.g., a considerable disarrangement and loss of packets.

This comparison result may be applied, preferably offline, to one or more further applications transmitting data packets over the packet network 1. The same disarrangement level and loss rate that was determined from the comparison may be applied to the packets of the real-time application. Then, the degraded application signal may be applied to a method to assess the quality of a deteriorated real-time transmission experienced by a user. Thus, it is possible to gain a quick survey of the transmission quality of a packet network with regard to various different applications without the need of cumbersome re-transmission for each specific application, requiring extensive bandwidth resources.

Figure 2:
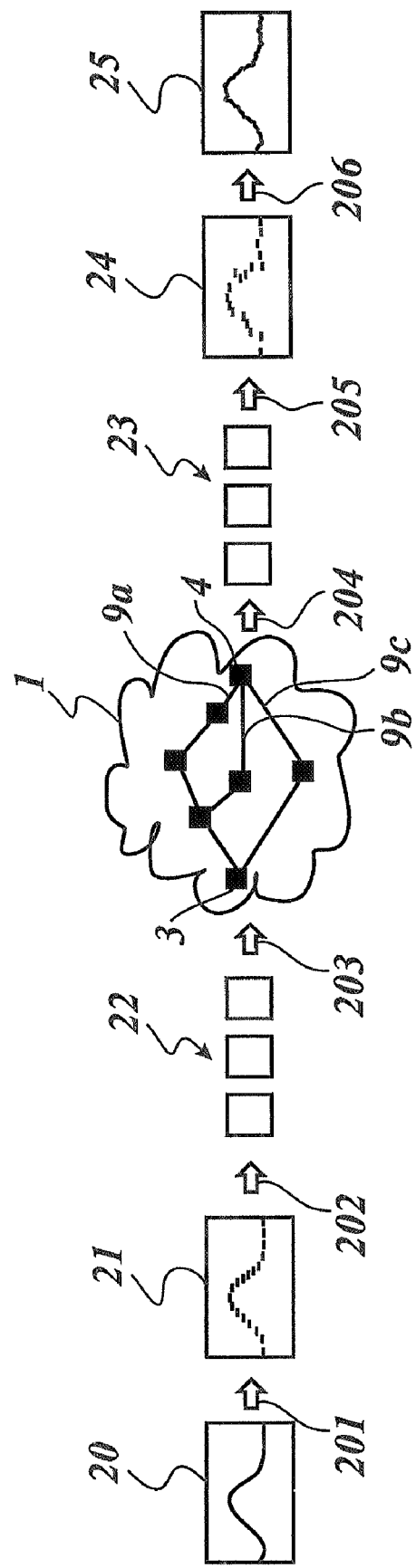
FIG. 2 is a schematic describing the processing of real-time media signals as relevant for the quality monitoring.

FIG. 2 shows a schematic describing the processing of real-time media signals for the quality monitoring in the system according to FIG. 1.

First, a packet stream pattern 22 has to be accessed and injected. Let us assume that the quality of a real-time voice communication such as a VoIP telephone call in the packet network 1 is to be monitored. The packet stream pattern 22 is a packet representation of a media stream pattern 20. The packet stream pattern 22 is generated by transforming the media stream pattern 20 to a digital representation 21 of the media stream pattern 20, and encoding, packetising and compressing the digital representation 21 in compliance with the used packet transfer protocol.

The pattern of the packets 22 corresponds to the characteristics of the real-time communication that is to be quality-monitored. The packet representation of the media stream pattern 20 has the same properties as the packet representation of a real application signal with regard to protocol header, packet size, and transmission rate. These properties depend on the application, as well as on the applied coding, packetising and compressing technique. In the case of quality monitoring of a telephone communication, for example every 20 ms a reference packet with a payload size of 160 byte is sent.

The packet stream pattern 22 has only be pre-defined once before the test, i.e., before the quality monitoring begins and the packet stream pattern 22 is transmitted for the first time. Preferably, the determination of the media stream pattern 20 and the generation of the packet stream pattern 22 is processed by the controller 10. Alternatively, these steps may also be performed by any other suitable network element comprising the necessary functionality or by a dedicated element outside of the network such as a centralised control server controlling and/or supporting the quality monitoring within one or more networks. Then, the network element controlling the quality monitoring, i.e., the controller 10, accesses the packet stream pattern 22 and prepares the injection of the packet stream pattern 22 into the network 1.

The determined packet stream pattern 22 is distributed by the controller 10 as reference file to the test points 3, 4. Alternatively, only the characteristics of the packet stream pattern 22 are distributed to the proper network elements hosting the test points 3, 4, the content is not required. These characteristics may comprise the sequence of the packets and/or the dispatch time of the packets.

The test points 3, 4 store the received original packet stream pattern in a memory and access it from the memory when they need it later for transmission or comparison purposes. Usually, the test takes place several times, preferably periodically, to monitor the quality over a longer time span. At all test packet transmissions, the same packet stream pattern 22 is injected.

The controller 10 may be represented by a dedicated element of the network 1 or a separate autonomous unit which is not part of the network 1, or may be integrated into a common network element. In this preferred embodiment, the controller 10 controls the quality monitoring and initiates the steps associated with the monitoring. But it is also possible that the quality monitoring is performed without a dedicated separate control unit 10. For example, a network element such as a POP associated with a test point or probe may have all capabilities and functionalities to control the quality monitoring. Alternatively, it is also possible that a network element such as a switching unit or exchange of the network 1 which is not associated with a test point of a currently performed quality monitoring controls the quality monitoring.

A communication connection 9 is established between the probes 3, 4 wherein the probe 3 serves as a transmitter and the probe 4 serves as a receiver. The reference signal consisting of the packet stream pattern 22 is transmitted over the connection 9 from the transmitter 3 through the network 1 to the receiver 4.

In the packet network 1, a packet of the packet stream pattern 22 may be transported over the connection 9 via a multitude of different paths 9a, 9b, 9c. It is possible that some packets of the original packet stream pattern 22 injected at the first test point 3 are transported through the packet network 1 via a first path 9a, some are transported via a second path 9b, and the remaining packets are transported via still another path 9c. Thus, the sequence of the packets arriving at the second test point 4 may be different to the sequence the packets had been injected in at the first test point 3.

Likewise, although the packets of the packet stream pattern 22 may have been injected at the first test point 3 at regular times, e.g., each 20 ms a packet, the time intervals of the packets arriving at the second test point 4 may significantly differ. For example, the packets of the first path 9a may arrive first, then the packets of the third path 9c interwoven with some packets of the second path 9b, and last the bulk of the packets of the second path 9b. Thus, the original packet stream pattern 22 has been changed to a different packet stream pattern 23, resulting in the case of delay-sensitive real-time applications to a signal degradation.

While the payload transported with the reference packets 22 is relatively irrelevant as it can be anyway substituted offline at the evaluation facility with other contents, the protocol headers of the reference packets 22 are important since they have consequences for the packet switching and the packet handling in general. For example, the protocol headers comply with the IP, UDP, or RTP standard.

At the receiver 4, the degraded signal 23 is received from the network 1. The sequence of the received reference packets 23, the so-called test packets, is registered by the receiver 4 and the test packets 23 are provided with a time stamp. The header of the test packets 23 usually contains pieces of information which allow to determine whether packets of the reference packet pattern have been interchanged, lost or whether the packet pattern has undergone other changes.

Test packets 23 which have suffered from bit errors are detected by check sums. If they cannot be repaired, they are discarded. In contrast to packets sent under TCP, where flawed packets are re-requested, erroneous packets sent under UDP are simply discarded. Also the different handling of erroneous packets, which is specific to a protocol used in a network, contributes to the resulting characteristics of a degraded packet stream pattern.

A protocol between the pair of transfer points, the transmitter 3 and the receiver 4, controls start, end, and parameters of the test. The test can be executed continuously, periodically, or on request. Furthermore, the test can be executed bi-directionally or uni-directionally.

In a preferred embodiment, the reference packets 22 are sent by the transmitter 3 according to a playout schedule with high accuracy, and they are received at the receiver 4 where they are recorded along with the exact reception time.

In a next step, it is possible to simulate a transmission quality of a real-time communication.

The evaluation of the test, i.e., the analysis of the reference and the received signal can take place either in the probes 3, 4 or in the controller 10. Since the reference signal 22 is a pre-defined signal, it is available at any probe 3, 4 and does not have to be sent through the network 1. Even the received signal 23 need not be transmitted from the receiver 4 to the evaluation instance, such as the controller 10, as the received signal 23 can be reconstructed from the reference signal 22 by applying the pattern of time stamps and sequence numbers of the received packets 23 which is stored at the receiver 4.

To save transmission capacity, it is preferred to transmit only the information about the recorded characteristics of the degraded packet stream 23 to the evaluation instance instead of transmitting the degraded test signal which would require a larger bandwidth. This is sufficient because out of the reference signal 22 and the characteristics of the degraded packet stream 23, the original test signal 23 can be reconstructed.

Preferably, the reconstruction is done by applying parameters characterising the mode of operation or the implementation of a particular device such as a VoIP telephone terminal.

The test packets 23 are filled offline with media content. For example, the packets of a digitised and packetised telephone communication are brought into the same pattern as the test packets 23 received at the receiver 4, i.e., the packets of a real-time telephone communication are brought into the same order as the test packets 23 received at the receiver 4 and the same packets of the telephone communication are deleted as the test packets 23 that have been lost.

The characteristics of the originally injected packet stream pattern 22 and the characteristics of the degraded received packet stream pattern 23 are compared. The comparison results are then passed to an application specific quality analysis process which will result in a few simple to interpret quality values.

There is a number of standardised methods to assess the quality of a deteriorated real-time transmission experienced by a user. For telephony, a perceptual model like PESQ might be used (PESQ=Perceptual Evaluation of Speech Quality). PESQ measures end to end voice quality by comparing an input test signal with the signal output, and is effective across a range of telephone network types, including PSTN, mobile, and VoIP (PSTN=Public Switched Telephone Network). It measures the effects of distortions such as noise, dropouts, and front-end clipping to model and predict the perceived speech quality The most eminent result of PESQ is the MOS value (MOS=Mean Opinion Score). MOS is a measurement of quality of the audio heard by the listener on a phone. It directly expresses the voice quality. Most scores break down into the following categories: 1=bad; 2=poor; 3=fair; 4=good; 5=excellent. "Toll quality" sound is generally associated with a MOS score of at least 4. G.711 starts with an intrinsic MOS value of 4.4, while G.729, which performs significant compression, has an intrinsic MOS value of 4.1. Of course, the MOS score on a VoIP network is further reduced when there is packet loss, excessive delays, etc.

Figure 3:
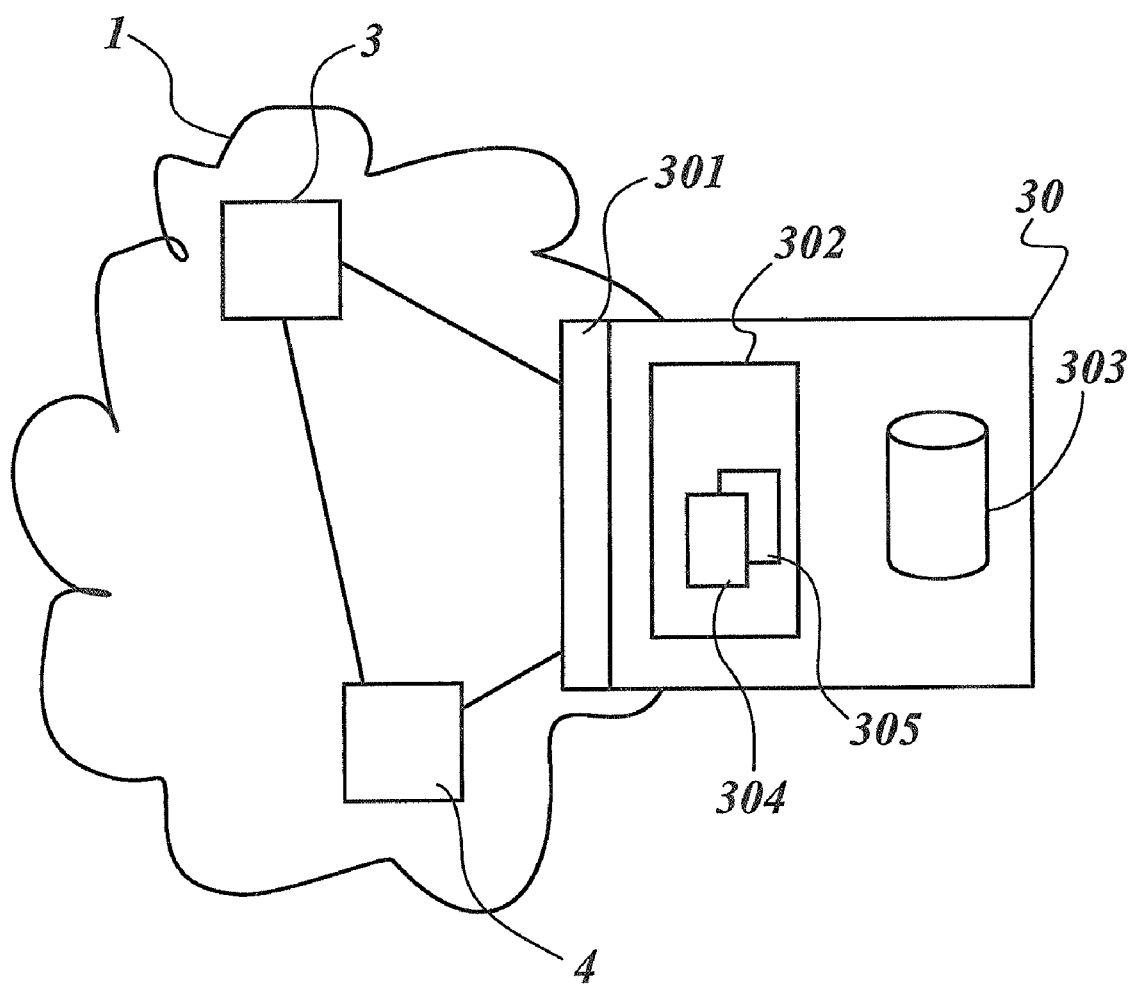
FIG. 3 is a detained view of a controller of the quality monitoring.

FIG. 3 shows a detained view of a dedicated controller 30. The controller 30 comprises an interface module 301 for receiving data from the test points 3, 4 associated with network elements and sending data from the controller 30 to the test points 3, 4. For example, the controller 30 sends the pre-defined media stream pattern 22 to the transmitter probe 3, receives information about the characteristics of the degraded media stream pattern 23 from the receiver probe 4, processes the comparison and evaluation steps, and sends information about the results of the evaluation process to another network element, such as an operator's workstation, for further processing. Further, the controller 30 comprises a control unit 302 for controlling the quality monitoring, whereby the control unit 302 comprises a comparison module 304 and an evaluation module 305. Furthermore, the controller 30 comprises a memory 303 for storing data and software.

The control unit 302 controls the flow of information between the controller 30 and the test points 3, 4, the flow of information among the different units 301 to 305 within the controller 30 or associated with the controller 30, and performs general processing and calculation tasks. The control unit 302 comprises at least one processing unit, preferably processing the steps of a computer program product for quality monitoring, whereby the computer program product is stored in the memory 303. Thus, the control unit 302 controls the operation of the comparison module 304 and an evaluation module 305.

The comparison module 304 analyses the degraded media stream pattern 23 and the original media stream pattern 22. It compares the characteristics of both patterns and determines the changes to the original media stream pattern 22 caused by the transfer through the packet network 1.

For example, a reference signal comprises three packets A, B, C which are injected in the order A, B, C at the first test point 3 into the network 1. The packet B is sent 20 ms later than the packet A, and the packet C is sent 20 ms later than the packet B. Due to transmission errors of the communication network 1, the receiver 4 only receives the packets A and C, in the order C, A. When comparing the characteristics of pattern C, A of the degraded packet stream pattern with the characteristics of pattern A, B, C of the original packet stream pattern, the comparison module 304 determines that the packet B has been lost and that the first and the last packet have been switched. Additionally, the comparison module 304 determines that the received packet A has a delay of 60 ms with respect to packet C.

The comparison module 304 may keep the comparison result. Preferably, several test runs are performed and the comparison module 304 does the comparison for all test runs. Finally, it may calculate statistical values. In a next step, the comparison module 304 sends the comparison results to the evaluation module 305.

The evaluation module 305 applies the comparison results to a real-time application specific media stream pattern, i.e., a real media stream pattern is modified such that it complies with the analysed comparison results. Related to the aforementioned example, the characteristic pattern C, A is applied to a real media stream pattern, such as a telephone call with the packetised form A, B, C. Only the first and the third packet of the telephone call are kept and switched while the second packet is deleted. Then, the degraded telephone call may be decoded and digitised and finally analysed by means of a quality assessment tools such as PESQ.

The capabilities of the evaluation module 305 are very powerful: it is possible to simulate arbitrarily many application signals complying with different protocols, such as audio signals (e.g., VoIP, MPEG 1 Audio Layer 3), video signals (e.g., MPEG 4, AVI), etc. (MPEG=Moving Picture Experts Group; AVI=Audio Video Interleave). Furthermore, different receiver behaviours can be simulated, e.g., a PSTN phone, a VoIP softphone, or a VoIP hardphone. Data needed for the different simulations can be stored in and retrieved from the memory 303 of the controller 30.

Figure 4:
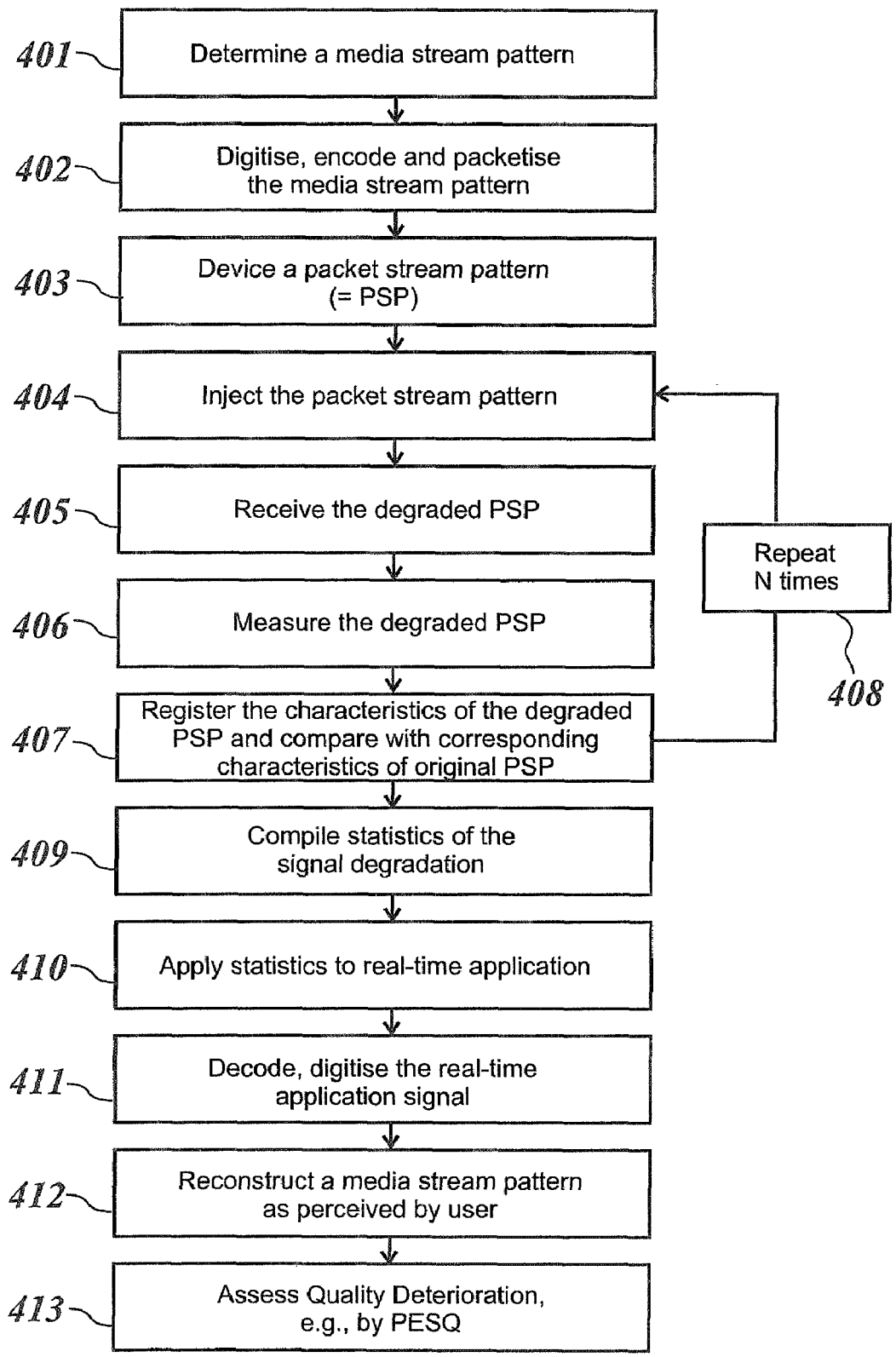
FIG. 4 shows a simplified flow diagram of one implementation of one embodiment of quality monitoring.

FIG. 4 shows a simplified flow diagram of one implementation of one embodiment of quality monitoring. In step 401, a media stream pattern is determined. In the following step 402, the determined media stream pattern is digitised, encoded, and packetised according to the used packet transport protocol, thus deriving a packet stream pattern, in step 403. The packet stream pattern is accessed and injected, in step 404 at a first test point of a packet network.

In the following step 405, the injected packet stream pattern is received in a degraded form at a second test point of the network. In step 406, the degraded packet stream pattern is measured and the characteristics of the degraded packet stream pattern, i.e., the time of reception and the sequence of received packets, are registered in step 407. The characteristics of the degraded packet stream pattern are compared with the corresponding characteristics of the originally injected packet stream pattern. The steps 404 to 407 may be repeated N times 408 until the statistics 409 of the degradation level have reached a desired fineness.

The compiled statistics 409 are applied to a real-time application, thus simulating a real degraded application specific packet stream pattern 410. Then, the degraded application specific packet stream pattern may be decoded and digitised 411. Thus, from the degraded packet stream pattern, a media stream pattern as perceived by a user is reconstructed 412. Finally, the quality deterioration, as experienced by a user, of an application specific real-time signal sent through the packet network is assessed in step 413. The quality deterioration is analysed by means of a quality assessment tools such as PESQ.

The chosen quality analysis algorithm depends on the application which the network is to be quality-monitored for. For example, audio signals will require a different analysis algorithm than video signals. The result of this analysis may be used for checking a SLA between a network operator and a network subscriber.

Figure 5:
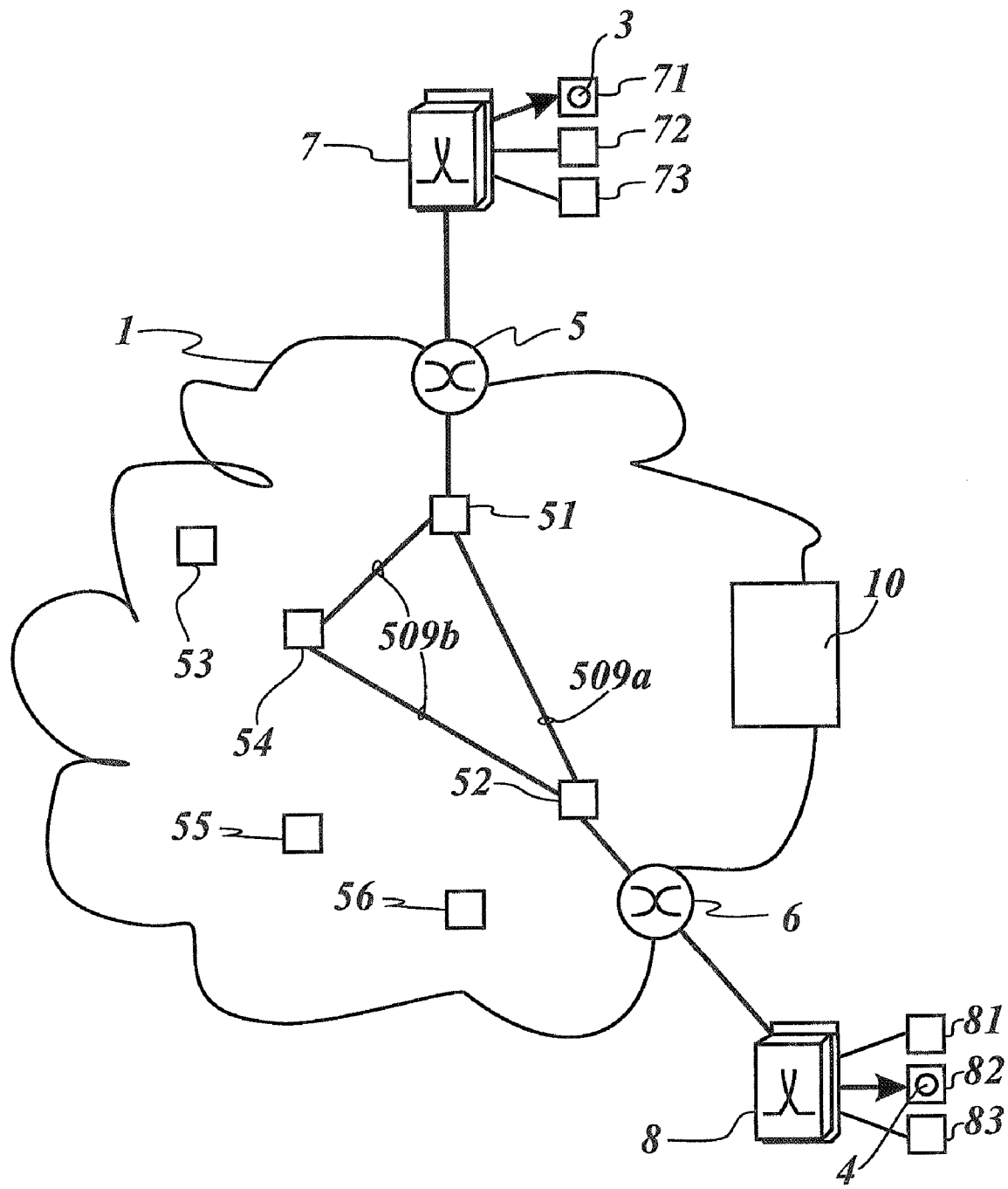
FIG. 5 is a block diagram of a system for providing quality monitoring in a packet-switching network according to another embodiment.

FIG. 5 is another embodiment of the invention. The method according to the embodiment shown in FIG. 1 provides a quality evaluation limited to the packet network. It takes into account the quality degradation caused by jitter, mis-sequencing and packet loss. Further impact in the terminals or other networks and equipment must be measured separately. This can be done by end-to-end or incremental measurements. The principle of end-to-end measurement is shown in FIG. 5.

According to FIG. 5, the transmitter probe 3 is integrated in and/or represented by a terminal 71 and the receiver probe 4 is integrated in and/or represented by another terminal 82. Preferably, the terminals 71, 82 are VoIP terminals which are capable to handle packets. The reference packets are sent from the transmitter probe 3 within the terminal 71 across the packet network 1 to the receiver probe within the terminal 82. Thus, the signal degradation—and the quality measurement—are not limited to the packet network, but also the impact of elements associated with the network 1 such as the gateways 5, 6, the local switching units 7, 8, the packet exchange units 51 to 52, and the terminals 71, 82 themselves, acting as test points, on the quality degradation of a real-time communication can be evaluated.

There are many ways how these communication elements may affect the packet signal quality. For example, VoIP terminals usually make use of a digital buffer where packets are kept until a specific number of packets has been aggregated. Or, some VoIP phones reject exceedingly many packets of the arriving packet stream.

In a preferred embodiment, it may be useful to transmit the packet stream pattern not only in the direction from the first test point 3 to the second test point 4, but likewise also in the opposite direction from the second test point 4 to the first test point 3. A bi-directional real-time application such as a VoIP telephone call between Alice, using the telephone terminal 71, and Bob, using the telephone terminal 82, may be affected by packet transport effects depending on the direction of packet transport.

For example, the packets originating from Alice may first arrive at and be switched by the packet exchange unit 51 of a first manufacturer, the packets originating from Bob may first arrive at and be switched by the packet exchange unit 52 of a second manufacturer. Each manufacturer may have implemented a switching decision process controlled by a manufacturer-specific algorithm. Due to the different algorithms, packets may be switched different. Then the packets from Alice may be transported on path 509*a* over the network 1 while the packets from Bob are transported on path 509*b*, resulting in different arrival time and arrival sequence characteristics.

The invention claimed is:

1. A method of monitoring the quality of a real-time communication in a packet network comprising at least two test points, wherein the method comprises the steps of:
   accessing a packet stream pattern;
   injecting the packet stream pattern at a first test point;
   receiving a degraded racket stream pattern at a second test point after transmission of the packet stream pattern through the packet network;
   determining characteristics of the degraded packet stream pattern;
   comparing the characteristics of the degraded packet stream pattern with corresponding characteristics of the packet stream pattern injected at the first test point; and
   evaluating, based on the comparison result, data concerning a signal quality degradation caused by transmission through the packet network by a simulation of a transmission quality of the real-time communication, wherein said comparison result is applied to media streams of a real-time application by modifying a pattern of the media stream, such that it complies with the analysed comparison results and applying the degraded application signal to a method to assess the quality of a deteriorated real-time transmission experienced by a user.

2. The method of claim 1, further comprising:
   measuring one or both of arrival time data and/or arrival sequence data of the packets of the degraded packet stream pattern; and
   adopting the measured values as characteristics of the degraded packet stream pattern.

3. The method of claim 1, further comprising:
   repeating one or more times the steps of injecting the packet stream pattern, receiving the degraded packet stream pattern, determining characteristics of the degraded packet stream pattern, and comparing the characteristics of the degraded packet stream pattern with corresponding characteristics of the packet stream pattern injected at the first test point; and compiling statistics relating to the comparison results for a quality prediction of a real-time communication.

4. The method of claim 1, further comprising:
applying the comparison result to media streams of a real-time application; and
evaluating data concerning quality degradation specific to the real-time application.

5. The method of claim 1, further comprising:
injecting the packet stream pattern at the first test point at defined times;
receiving the degraded packet stream pattern at the second test point, whereby the first test point and the second test point are synchronized in time, and determining arrival time data of the degraded packet stream pattern;
evaluating, based on the arrival time data, data concerning quality degradation, in particular the packet delay, jitter, and other temporal effects.

6. The method of claim 1, further comprising:
transmitting the packet stream pattern uni-directionally or bidirectionally.

7. The method of claim 1, wherein the first test point and the second test point of the packet network are pre-defined measurement points at identified network elements.

8. The method of claim 1, wherein the quality monitoring is performed end-to-end between terminals of a real-time communication.

9. The method of claim 1, wherein the first and second test points are individually located at a Point of Presence (POP) in the packet network, an exchange in the packet network, a switch in the packet network, or a router in the packet network.

10. The method of claim 1, wherein the first and second test points are individually located at a switch in the packet network or a router in the packet network.

11. The method of claim 1, wherein the first test point is located at a first network element in the packet network, the first network element being connected to a first gateway providing an interface between the packet network and a first local switching unit, and wherein the second test point is located at a second network element in the packet network, the second network element being connected to a second gateway providing an interface between the packet network and a second local switching unit.

12. A network element of a packet network for monitoring the quality of a real-time communication in the packet network, comprising:
at least two test points; and
a control unit adapted for triggering the access of a packet stream pattern, initiating the injection of the packet stream pattern at a first test point, initiating the reception, after transmission of the packet stream pattern through the packet network, of a degraded packet stream pattern at a second test point and the determination of characteristics of the degraded packet stream pattern, and controlling the comparison of the characteristics of the degraded packet stream pattern with corresponding characteristics of the packet stream pattern injected at the first test point and the evaluation, based on the comparison result, of data concerning a signal quality degradation caused by transmission through the packet network by a simulation of a transmission quality of the real-time communication, wherein said comparison result is applied to media streams of a real-time application by modifying a pattern of the media stream, such that it complies with the analysed comparison results and applying the degraded application signal to a method to assess the quality of a deteriorated real-time transmission experienced by a user.

13. The network element of claim 12, wherein the first and second test points are individually located at a Point of Presence (POP) in the packet network, an exchange in the packet network, a switch in the packet network, or a router in the packet network.

14. The network element of claim 12, wherein the first and second test points are individually located at a switch in the packet network or a router in the packet network.

15. The network element of claim 12, wherein the first test point is located at a first network element in the packet network, the first network element being connected to a first gateway providing an interface between the packet network and a first local switching unit, and wherein the second test point is located at a second network element in the packet network, the second network element being connected to a second gateway providing an interface between the packet network and a second local switching unit.

16. A computer readable medium with computer-executable instructions for monitoring the quality of a real-time communication in a packet network comprising at least two test points, the computer-readable medium comprising computer-executable instructions for, when executed by a network element of the packet network, performing the steps of:
triggering the access of a packet stream pattern;
initiating the injection of the packet stream pattern at a first test point;
initiating the reception, after transmission of the packet stream pattern through the packet network, of a degraded packet stream pattern at a second test point and the determination of characteristics of the degraded packet stream pattern;
comparing the characteristics of the degraded packet stream pattern with corresponding characteristics of the packet stream pattern injected at the first test point; and
evaluating, based on the comparison result, data concerning a signal quality degradation caused by transmission through the packet network by a simulation of a transmission quality of the real-time communication, wherein said comparison result is applied to media streams of a real-time application by modifying a pattern of the media stream, such that it complies with the analysed comparison results and applying the degraded application signal to a method to assess the quality of a deteriorated real-time transmission experienced by a user.

17. The computer-readable medium of claim 16, wherein the first and second test points are individually located at a Point of Presence (POP) in the packet network, an exchange in the packet network, a switch in the packet network, or a router in the packet network.

18. The computer-readable medium of claim 16, wherein the first and second test points are individually located at a switch in the packet network or a router in the packet network.

19. The computer-readable medium of claim 16, wherein the first test point is located at a first network element in the packet network, the first network element being connected to a first gateway providing an interface between the packet network and a first local switching unit, and wherein the second test point is located at a second network element in the packet network, the second network element being connected to a second gateway providing an interface between the packet network and a second local switching unit.

* * * * *